United States Patent [19]
Earley et al.

[11] Patent Number: 4,970,697
[45] Date of Patent: Nov. 13, 1990

[54] VERTICAL MARINE SEISMIC ARRAY

[75] Inventors: Ray G. Earley; David C. Bradshaw, both of Tulsa, Okla.

[73] Assignee: Amoco Corporation, Chicago, Ill.

[21] Appl. No.: 417,953

[22] Filed: Oct. 6, 1989

[51] Int. Cl.$^5$ ............................ G01V 1/20; G01V 1/38
[52] U.S. Cl. ........................................ 367/15; 181/112
[58] Field of Search ..................... 367/15, 16, 57, 58, 367/20, 56; 181/110, 112

[56] References Cited

U.S. PATENT DOCUMENTS

| | | | |
|---|---|---|---|
| 4,694,435 | 9/1987 | Magneville | 367/17 |
| 4,870,624 | 9/1989 | Marschall | 367/15 |
| 4,872,144 | 10/1989 | Young et al. | 367/20 |
| 4,894,807 | 1/1990 | Alam et al. | 367/15 |

OTHER PUBLICATIONS

"Research Note: Horizontal & Vertical Arrays at Sec," Merzer, A. M., Geophys. J. R., Astro Soc., vol. 29, pp. 367-370, 1972.
"Seismic Reflection Profiling with a Deep-Towed Vertical Hydrophone Array," Collins et al., Oceanographic Institution, Marine Geophysical Research, 6, pp. 415-431, 1984.
"A Simple Deep-Towed Vertical Array for High Resolution . . . ", Herber et al., Marine Geophysical Research, 8, (1986), pp. 175-186.

*Primary Examiner*—Ian J. Lobo
*Attorney, Agent, or Firm*—Scott H. Brown; Fred E. Hook

[57] ABSTRACT

A method of acquiring seismic data is disclosed which includes a horizontal towed receiver array in conjunction with at least one vertically oriented receiver array formed from a plurality of receiver elements spaced apart vertically within a plurality of cable. By simultaneously recording the data from both arrays, seismic data can be acquired for locations directly beneath a fixed obstruction, which a towing vessel has had to steer around.

3 Claims, 3 Drawing Sheets

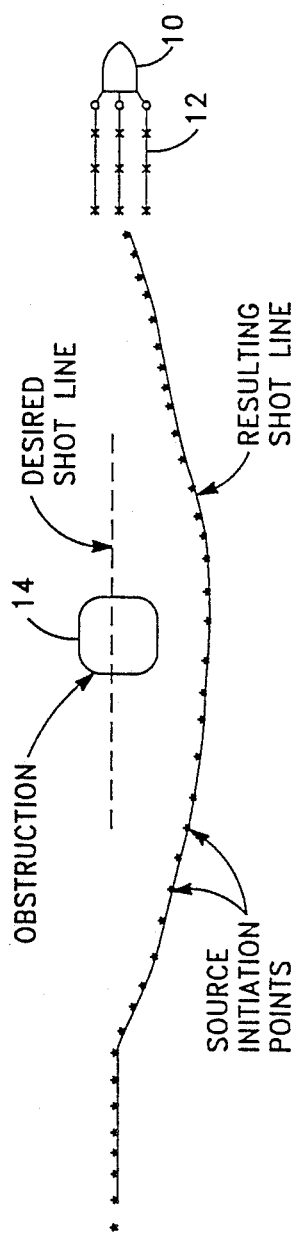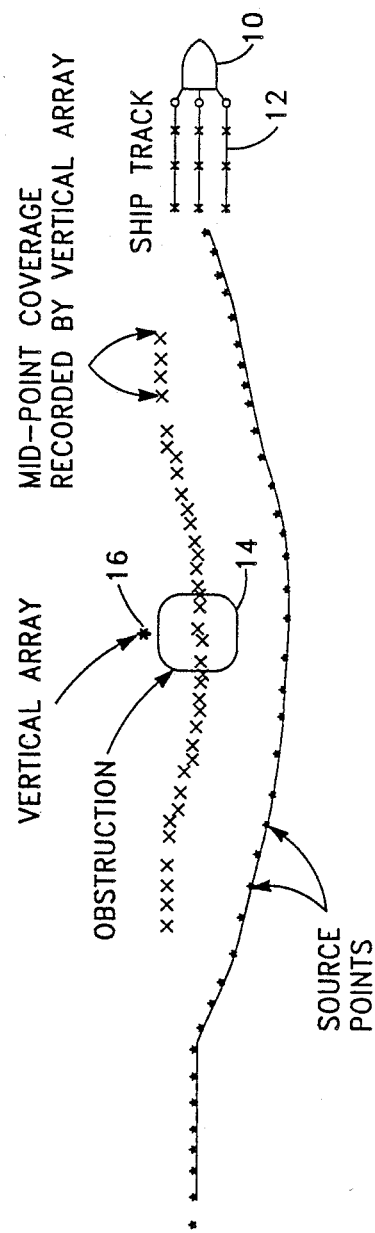

4,970,697

VERTICAL MARINE SEISMIC ARRAY

BACKGROUND OF THE INVENTION

1. Field of the Invention

The present invention relates to methods of acquiring subsurface reflection signals in a marine environment and, more particularly, to such methods that utilize towed horizontal receiver arrays in conjunction with vertically disposed receiver arrays to obtain the reflection signals beneath a fixed obstruction.

2. Setting of the Invention

As shown in FIG. 1, a seismic vessel 10 is illustrated towing very long (e.g., about 3 kilometers) cable(s) of seismic receivers 12 along a desired shot line. The receiver array 12 can become entangled in fixed obstructions, such as production platforms, structures and equipment 14 that are used to produce oil/gas. To avoid such entanglement, the vessel 10 must steer away from the structures 14, which thus moves the shot line and the resulting data away from the structures 14, which in turn causes a gap in the seismic data directly beneath the structure 14. Often times one desires to record seismic reflections in and around a known production zone, e.g., directly under the offshore structure 14, but one is prevented because of the entanglement problem.

Further, in the acquisition of subsurface reflection signals in a marine environment, it is well known to utilize linear arrays of horizontal seismic energy receivers, i.e., a plurality of towed streamers wherein each streamer contains a plurality of hydrophones. While these linear arrays of seismic energy receiver elements are especially good at attenuating, i.e., reducing or eliminating, seismic noise waves that travel parallel to or nearly parallel to the linear array, these linear arrays are relatively ineffective at attenuating horizontally traveling seismic noise waves that travel in a nonparallel direction to the linear array.

There is a need for a marine data acquisition method that can be used in close proximity to fixed structures and to attenuate undesired noise.

Vertical arrays of seismic energy receiver elements have been used in the acquisition of subsurface reflection signals in a marine environment. Examples of vertical arrays are disclosed in U.S. Pat. No. 4,694,435; "Research Note: Horizontal and Vertical Arrays at Sea," Merzer, Mar. 18, 1971, Geophysics, J. R. Astrological Society (1972), 29, 367-370; "Seismic Reflection Profiling With a Deep-Towed Vertical Hydrophone Array," Collins et al., Oceanographic Institution, November 1983, Marine Geophysical Research 6 (1984), 415-431; and "A Simple Deep-Towed Vertical Array for Higher-Resolution Reflection Seismic Profiling," Herber et al., Marine Geophysical Research 8 (1986), 175-186.

SUMMARY OF THE INVENTION

The present invention has been contemplated to overcome the foregoing deficiencies and meet the abovedescribed needs. Specifically, the present invention is a method of seismic acquisition wherein a typical horizontal towed array of receiver elements is used in conjunction with at least one vertical array, which is attached to a fixed obstruction or spaced closely thereto. By using both of these arrays and recording signals from both simultaneously, the resulting data can be interspersed to fill in any undesired gaps in the data around a fixed obstruction. The vertical array comprises a plurality of vertically oriented receiver arrays formed from a plurality of receiver elements each spaced apart vertically and connected to a plurality of cables. If more than one vertical cable is used, the horizontal spacing between each cable and the vertical spacing between each receiver element within each cable are selected to attenuate selected frequencies of nonvertically travelling acoustic energy. The vertical array can be slowly towed through the water or it can be moored from the fixed obstruction or closely thereto; thus, the vertical array of the present invention can be utilized in close proximity to fixed structures. Further, because the marine array extends horizontally, as well as vertically, the information received from such array can be used with various seismic processing techniques to acquire 2-D and 3-D seismic profiling.

BRIEF DESCRIPTION OF THE DRAWINGS

FIG. 1 is a plan view of a seismic acquisition vessel's track around a fixed obstruction and showing a resulting gap in the acquired data under and around the obstruction.

FIG. 2 is a plan view of a seismic acquisition vessel's truck around a fixed structure, which includes a vertical receiver array in accordance with the present invention, and the resulting seismic data line with no gaps.

DETAILED DESCRIPTION OF THE PREFERRED EMBODIMENTS

Figure 3:
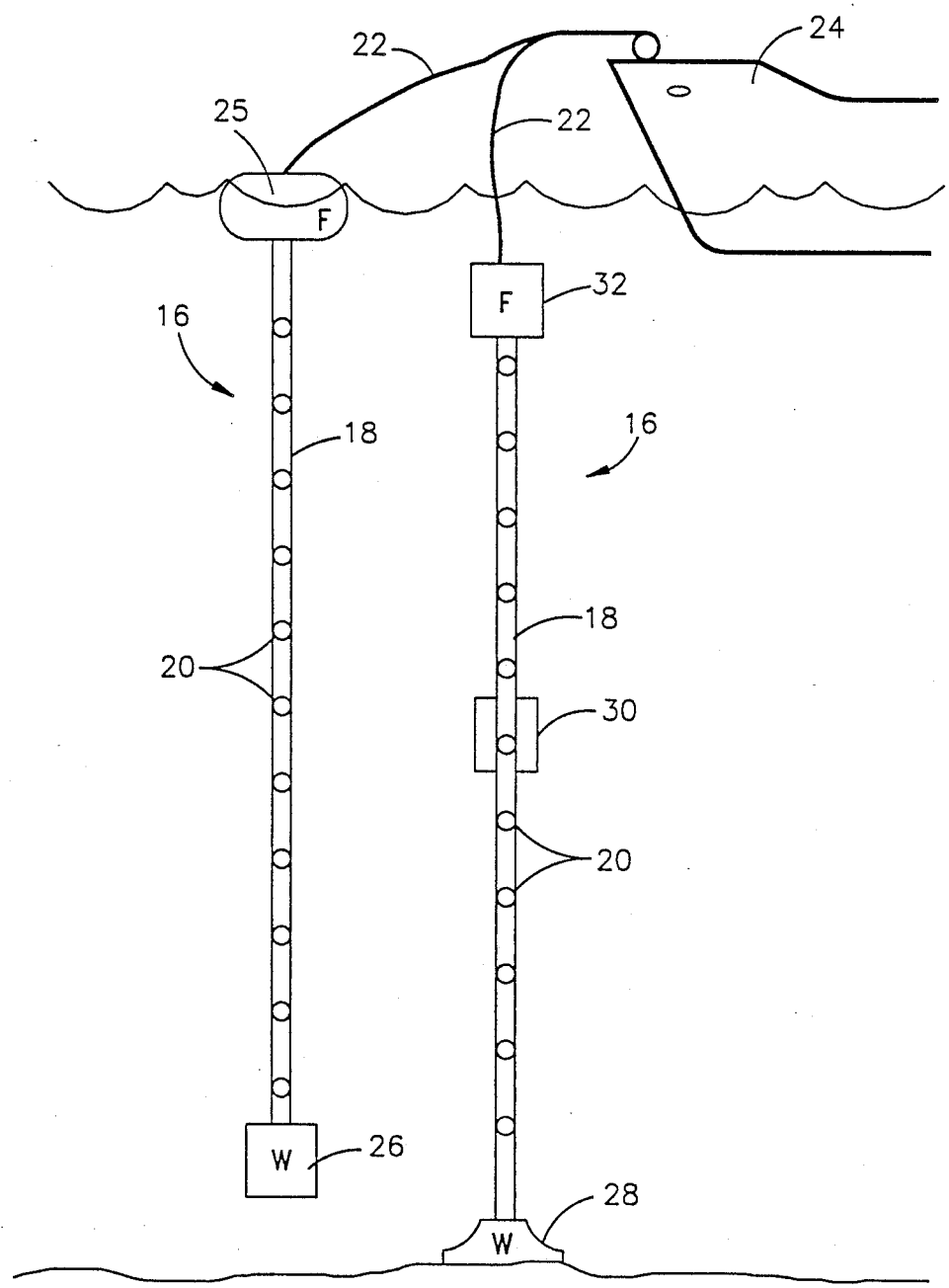
FIG. 3 is a side elevational view of two vertically disposed cables having a plurality of receiver elements connected to each and which are used in a vertical array in accordance with the present invention.

A method of seismic data acquisition is disclosed wherein both a horizontal towed receiver array and at least one vertical receiver array are used in conjunction to eliminate any data gaps caused when a towing vessel must deviate from the desired shot line because of a fixed obstruction.

As previously discussed, when the vessel 10 deviates from the desired shot line, the resulting shot line does not include data directly below the fixed obstruction 14. In accordance with the present invention, a conventional horizontal receiver array 12 is towed behind the vessel 10 and the vessel 10 still must deviate around the fixed obstruction 14. In addition, at least one vertical receiver array 16 (described in more detail below) is suspended from or deployed in close proximity to the fixed obstruction 14, a prescribed distance from the resulting path of the vessel 10 and the horizontal receiver array 12.

Recordings from the vertical receiver array 16 are made simultaneously with the ones performed on the seismic vessel 10 for the horizontal array 12. The synchronization of these recordings is accomplished by means of a radio link between the vessel 10 and the recording system connected to the vertical array of receivers, as is well known to those skilled in the art.

Reflections recorded in this manner convey information about the subsurface beneath a point that lies midway between the seismic source location (on the vessel 10) and the vertical array's 16 location. Locating the vertical array (or perhaps several vertical arrays) as shown in FIG. 2 will generate data from subsurface areas beneath the obstruction 14 that cannot be examined by the normal seismic acquisition. Combining this vertical data with that recorded on the survey vessel 10 can be accomplished in known manners during later data processing, thus filling the holes and gaps.

The information recorded from the individual receivers of the vertical array may be improved by a well-known technique called "array forming" or "beam forming." This technique may be applied in the data processing center after recording or as the data are acquired by inserting specially constructed electronic circuits into the signal path between the individual receivers and the recording system. In either case, array forming enhances the desirable reflection information over acoustic noise. Because the array of receivers is vertical, its response is omnidirectional and therefore, signal-to-noise improvement can be obtained regardless of the relative lateral positions of the seismic vessel and vertical array. The source array used on the vessel 10 preferably has a lateral extent, i.e., more than one gun to provide for the greatest energy generation, such as for when the received signals are to be utilized in wide-line profiling techniques. Further, the source array can have a vertical extent, or it can be the conventional horizontal array of towed arrays.

As shown in FIG. 3, each vertical receiver array 16 is formed from a plurality of individual cables which are horizontally spaced each from another in a manner to attenuate selected frequencies of nonvertical acoustic energy, which will be described in more detail below. Each type of cable used within a receiver array comprises a cylindrical body, cable or chain 18 which includes therewithin or attached to the exterior thereof a plurality of receiver elements 20. Each receiver element 20 can be electrically connected in series to form a single resulting signal, which is sent through an acquisition cable 22 to a vessel 24, wherein the plurality of signals from the plurality of cables are recorded as is desired. Preferably, the receiver elements 20 are electrically connected such that each receiver element 20 is individually recorded, for later processing reasons. If the cable is to be suspended from the water surface, a float member 25 can be included at or near the surface of the water and with the body 18 extending downwardly in essentially a vertical position by the means of a lowerly mounted weight 26 or, by a plurality of weights (not shown) mounted throughout the body 18. If the cable is to be bottom secured, then a bottom weight 28 can be included that will hold the cable body 18 to the floor of the body of water with the body 18 rising vertically therefrom by means of internal buoyancy within the body 18, as provided by air bags or air cells, one or more floats 30, and/or an upper float 32.

The vertical spacing of the seismic energy receiver elements 20 is such that they are close enough to prevent spatial aliasing for a given frequency of noise waves, and have a total vertical length which is equal to or greater than the total lateral or horizontal extent.

The spacing of the receiver elements 20 is chosen on the basis of attenuating predetermined range of wave lengths of seismic noise waves. The determination of this spacing is made as follows. Using the well-known equation:

$$\text{frequency} = \frac{\text{velocity}}{\text{wave length}},$$

and the relation: wave length equals about two times the horizontal extent; the correct lateral spacing of receiver elements is $$d = \frac{\text{velocity}}{2 \times \text{frequency}}.$$

For example, if the frequency of seismic noise to be attenuated is 50 Hz, and the velocity of the noise is 1500 m/sec, then $$d = \frac{1500 \text{ m/sec}}{2 \times 50 \text{ Hz}} \text{ or } 15 \text{ m}.$$

The total horizontal extent, i.e., the distance between the outermost cables, is preferably wider than that of the vessel 24. Further, the horizontal spacing between each cable and the vertical spacing between each of the seismic energy receiver elements 20 within the cables are chosen so that nonvertically traveling acoustic energy are sampled often enough to prevent aliasing, a distance which depends upon the frequency of the signals and the seismic velocity of the noise wave.

The spacing of the individual seismic energy receiver elements vertically and horizontally can be equal or approximately equal, but again, close enough to prevent spatial aliasing. The vertical extent of the seismic energy receiver elements 20, usually about equal to the total length of the cable can be about two to about ten times as large as the lateral extent.

Figure 4:
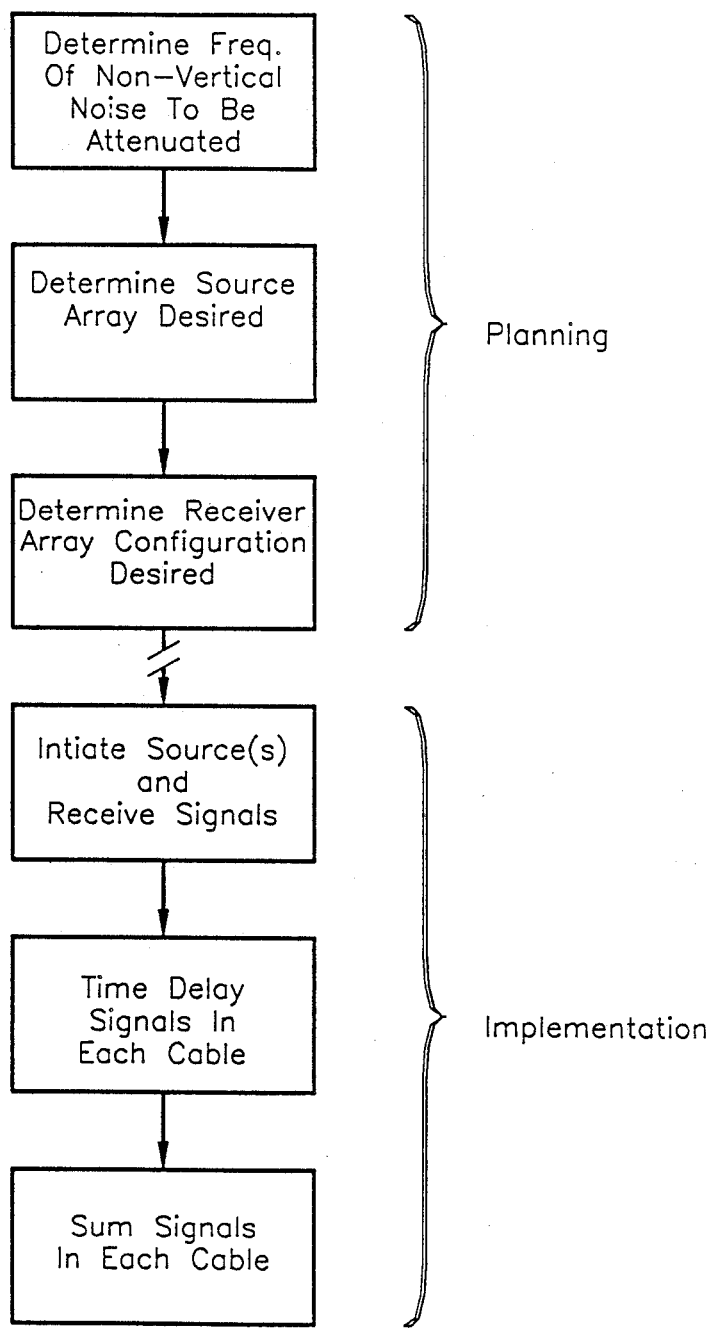
FIG. 4 is a flow diagram of methods of planning and implementing one embodiment of the present invention.

Once the determination is made of the frequency of the nonvertical noise that is to be attenuated, then the source array is planned, and then the receiver array configuration sizings, spacings, etc., are determined, as illustrated in the Planning portion of the flow diagram of FIG. 4. The designs are then implemented, as well-known to those skilled in the art, and are deployed within the water.

In one embodiment of the method, the seismic energy source array is disposed as near as possible (typically 50 m) to the receiver array, but not too close to induce excessive noise from the sources.

As shown in the Implementation portion of the flow diagram of FIG. 4, after initiation of the sources, acoustic energy reflected from the earth's subsurface is received at each receiver element 20, which then electrically creates a resulting signal. The signals from each of the receiver elements 20 can be individually recorded and filtered to remove undesired frequency signals, i.e., the frequencies to be processed are filtered to the desired bandwidth, and the seismic signals are then processed in any known manner. However, it is preferred that the signals are first processed by multiplying each signal or trace by a time constant or a time variant scalar calculated from the values of the trace sample, as is well known to those in the art, to ensure that the trace-to-trace amplitudes within any given time window are approximately equal. The individual signals from the seismic energy receiver elements 20 can be weighted and summed in the crossline direction any time during the processing. The energy waves traveling mainly vertically can, on the other hand, be accentuated by shifting and summing by methods known as "beam steering" that can be used with the present method. Preferably, directionality of the receiver array is achieved by summing the outputs of the receiver elements 20 in such a manner that only energy traveling up the array axes is added coherently. For example, the output of each receiver element 20, with the exception of the uppermost receiver element, is delayed by the water traveltime between that element and the element immediately above it.

This procedure of delaying and summing the hydrophone output is carried out consecutively for each array cable. For energy traveling up the array axis, this procedure results in a signal-to-noise gain at the top of the receiver array. By varying the hydrophone separation and varying the delays, different beam patterns can be generated, such as forward focused, up or downward focused and/or lateral focused.

In another embodiment, the signals from each receiver element 20 can be preamplified within the cable such that the preamplified signals from the hydrophones are fed to an analog or digital device onboard the vessel 24 via multiconductor cable 22. Manually or automatically controlled electronic mechanisms can be incorporated such that the signals from each of the cables are manipulated so that they are identical in both amplitude and phase.

A signal stacking procedure that is preferably utilized comprises delaying the signal from each receiver element 20 by the traveltime for the distance between the hydrophones by analog or digital devices or other means, and then adding this delayed signal to that from the next previous hydrophone. The delay time can be fine tuned within a range by means of a potentiometer and in this manner, the signal-to-noise ratio is improved. A correlation procedure can be adopted to improve the directional characteristics of the vertical receiver array in that the first step is to subtract the signal from the first hydrophone after it has been delayed a certain time from that of the next lower hydrophone. Since the bottom-reflected arrivals of the signal are already tailored to be nearly identical, this subtraction results in their cancellation. Side echoes and/or surface reflected arrivals such as from adjacent fixed structures, boats and the like, however, remain unaffected and appear as signals with opposite phases in a time separation.

Wherein the present invention has been described in particular relation to the drawings attached hereto, it should be understood that other and further modifications, apart from those shown or suggested herein, may be made within the scope and spirit of the present invention.

What is claimed is:

1. A method of surface seismic exploration in a marine environment having fixed obstructions to the collection of seismic data in a region of interest, comprising:
   (a) suspending at least one vertical receiver array in the water adjacent the obstructions;
   (b) towing a linear, horizontal receiver array along a generally linear track in proximity to the obstruction; and
   (c) initiating seismic source elements towed along the linear track and simultaneously recording the resulting seismic signals from the at least one vertical receiver array and the linear, horizontal receiver array.

2. The method of claim 1 wherein the at least one vertical receiver array is suspended from the obstruction.

3. The method of claim 1 wherein the at least one vertical receiver array comprises a plurality of suspended vertical receiver arrays aligned in proximity to the linear track.

* * * * *